US006537666B1

(12) United States Patent
Bronshtein

(10) Patent No.: US 6,537,666 B1
(45) Date of Patent: Mar. 25, 2003

(54) METHODS OF FORMING A HUMIDITY BARRIER FOR THE AMBIENT TEMPERATURE PRESERVATION OF SENSITIVE BIOLOGICALS

(75) Inventor: Victor Bronshtein, San Diego, CA (US)

(73) Assignee: Universal Preservation Technologies, Inc., San Diego, CA (US)

( * ) Notice: Subject to any disclaimer, the term of this patent is extended or adjusted under 35 U.S.C. 154(b) by 64 days.

(21) Appl. No.: 09/694,630

(22) Filed: Oct. 23, 2000

(51) Int. Cl.[7] .................................................. B32B 5/16

(52) U.S. Cl. .................... 428/402.2; 428/403; 428/407; 252/186.25; 252/315.3; 424/461; 424/455

(58) Field of Search ................................ 428/403, 407, 428/402.2; 252/186.25, 315.3; 424/461, 455

(56) References Cited

U.S. PATENT DOCUMENTS

| | | | | |
|---|---|---|---|---|
| 5,098,893 A | | 3/1992 | Franks et al. | 514/54 |
| 5,257,466 A | | 11/1993 | Kishi | 34/95 |
| 5,334,621 A | | 8/1994 | Beshouri | 521/64 |
| 5,428,906 A | | 7/1995 | Lynam et al. | 34/379 |
| 5,593,824 A | | 1/1997 | Tremi et al. | 435/4 |
| 5,662,279 A | | 9/1997 | Czekai et al. | 241/21 |
| 5,707,634 A | | 1/1998 | Schmitt | 424/400 |
| 5,766,520 A | * | 6/1998 | Bronshtein | 264/4.6 |

FOREIGN PATENT DOCUMENTS

| | | | |
|---|---|---|---|
| WO | WO 96/40077 | | 12/1996 |
| WO | WO 98/02240 | | 1/1998 |
| WO | WO98/02240 | * | 1/1998 |
| WO | WO 99/27071 | | 6/1999 |
| WO | WO 00/40910 | | 7/2000 |

* cited by examiner

*Primary Examiner*—Leszek Kiliman
(74) *Attorney, Agent, or Firm*—Knobbe, Martens, Olson & Bear LLP

(57) ABSTRACT

The present invention relates to methods of forming a humidity barrier using fats or other materials that can form an amorphous coating for particles comprising sensitive biological materials in a dehydrated and/or a vitrified state. Since the hydrophobic coating may be sticky, a second hard-shell coating is applied to prevent the particles from sticking together. This approach would minimize exposure of the dried biological material to atmospheric moisture and the consequent loss of biological activity.

14 Claims, No Drawings

METHODS OF FORMING A HUMIDITY BARRIER FOR THE AMBIENT TEMPERATURE PRESERVATION OF SENSITIVE BIOLOGICALS

BACKGROUND OF THE INVENTION

1. Field of the Invention

The present invention relates to methods of forming a humidity barrier using fats or other materials that can form an amorphous coating for particles comprising sensitive biological materials in a dehydrated and/or a vitrified state. Since the hydrophobic coating may be sticky, a second hard-shell coating is applied to prevent the particles from sticking together. This approach would solve a significant problem in achieving long-term shelf preservation of sensitive biological materials by minimizing the uncontrolled exposure to moisture and the subsequent loss of biological activity.

2. Description of the Related Art

The field of biological preservation encompasses a wide variety of methods used to preserve biological activity in sensitive materials. These preservation methods include refrigeration, freezing, freeze-drying (lyophilization), spray-drying, and more recently, preservation by foam formation (U.S. Pat. No. 5,766,520, incorporated herein by reference). The field of probiotics, which seeks to use the beneficial biological properties of certain types of bacterial strains to promote health in both humans and animals via nutritional and food supplements, presents a particular need for effective ambient temperature preservation, that is not met by present methods. Preservation of probiotic strains can be accomplished using any of the above methods. Moreover, ambient and even elevated temperature preservation of bacterial has been accomplished by dehydration through foam formation or spray drying.

However, none of these methods provide effective protection against the combination of humidity and ambient temperatures, both of which may be encountered by venders as well as consumers, unless special packaging materials or storage environments are utilized. For example, a low humidity storage container, possibly with added desiccants such as cotton or silica, may be used for packaging a pharmaceutical composition such as aspirin. In addition, humidity barrier packaging materials such as aluminum foil may be used for lyophilized or foam-preserved products. Glass containers may be used for frozen, lyophilized, foam-preserved and refrigerated products. In each case the protection provided by the packaging or storage environment is compromised as soon as the container is opened to the atmosphere, thereby exposing atmospheric moisture to the product.

The rate of moisture ingress and the resulting damage to the biological activity of the material is dependent on the nature of the preserved material, the temperature, and the physical state of the material. For dried products, exposure to moisture may cause either rapid (i.e. minutes) or slower (days to months) deterioration of biological activity, depending on the relative degree of protection offered by the method of preservation used. For refrigerated or frozen and thawed products, biologically active components, such as active cultures in yogurt, will have a limited shelf-life from the time it is placed into the package, typically measured in days.

Accordingly, a need remains for methods that combine the preservation of sensitive biological materials by drying with the protection of these dried materials from the deleterious effects of environmental moisture, wherein the biological activity of the dried materials are retained over a broad range of storage temperatures and humidities. Furthermore, the need exists for a humidity barrier that is not compromised by exposure of the preserved product to the atmosphere.

SUMMARY OF THE INVENTION

The present invention relates to a method for providing long-term ambient temperature preservation of a sensitive biological sample, having a biological activity. The method includes preserving the sensitive biological sample by drying under conditions wherein at least a portion of the biological activity is retained. The dried sample is milled to form a particulate preparation. The particulate preparation is coated with a first layer comprising a hydrophobic substance. A second layer is applied over the first layer, the second layer forming a hard shell at ambient temperature.

In one aspect of the present invention, the sensitive biological sample may be selected from the group consisting of a bacterium, a pharmaceutical composition, a vaccine, and a nutritional supplement.

The hydrophobic substance in accordance with a preferred method is a fat or an oil. Preferably, the fat or oil is selected from the group consisting of cotton-seed, corn, palm, soy, grapeseed (canola), cod-liver and other fish-based oils, omega-3 fatty acids, neem, olive, peanut, poppy, safflower, sesame, wheat-germ, and the like.

Coating of the particulate preparation with the second layer may be accomplished using a device adapted to produce a high shear mixing action. The second layer preferably comprises a material selected from the group consisting of a sugar, a protein, a polymer, or a mixture thereof.

In one preferred embodiment of the present method, the sensitive biological sample may be preserved by drying the sample in the presence of a protectant formulation. The sensitive biological sample and protectant formulation may be boiled under vacuum to form a mechanically stable foam.

In addition, or in the alternative, the sensitive biological sample may be preserved by drying the sample under a vacuum at a temperature greater than 20° C. for a period of time sufficient to increase the glass transition temperature of the sample above 20° C.

The present invention also relates to a storage particle adapted for long-term ambient temperature preservation of a sensitive biological material. The storage particle comprises a dehydrated preparation of the sensitive biological material, a first layer comprising a hydrophobic substance which surrounds the dehydrated preparation of the biological material, and a second layer comprising a hard shell at ambient temperature which surrounds the first layer. The first layer minimizes exposure of the dehydrated preparation of the biological material to atmospheric moisture.

DETAILED DESCRIPTION OF THE PREFERRED EMBODIMENTS

The foam preservation method described in U.S. Pat. No. 5,766,520 provides an effective way to preserve probiotic bacteria such as *Lactobacillus acidophilus* at relatively high storage temperatures (≧37° C.). However, much as with lyophilized materials, the bacteria preserved via this method is very hygroscopic, and thus is extremely sensitive to atmospheric humidity. The methods disclosed in U.S. Pat. No. 5,766,520, as well as co-pending U.S. patent application Ser. Nos., 08/979,458, 09/306,137, 09/589,381, 09/194,499, and 09/254,563 and co-pending U.S. Provisional Application Nos., 60/166,783, 60/149,795, and 60/166,928, (all of which are herein incorporated in their entirety by reference thereto) may be suited to preserving sensitive biological materials in a dry state. As a consequence, the material is very brittle and easily broken into discrete particles of varying size in a process of coarse milling. This can be accomplished via the use of any number of methods including crushing, gentle impacts, vibration, etc., as described in co-pending application Ser. No. 09/306,137. Machinery for this purpose is commonly available in the process industries. Once milled into discrete particles the material then can be treated by the process that is the subject of this invention.

Particulate, granulated, and/or powdered preparations of dried biological materials and preservative fillers generated by the processes of U.S. Pat. No. 5,766,520 and co-pending application Ser. No. 09/306,137, or any other suitable preservation methods (e.g., spray drying) are coated with an amorphous layer of vegetable or animal based fat, chosen from the group of materials consisting of partially or completed hydrogenated oils such as cottonseed, corn, palm, soy, grapeseed (canola), cod-liver and other fish-based oils, omega-3 fatty acids, neem, olive, peanut, poppy, safflower, sesame, wheat-germ, and the like, by a number of methods. The critical property in the selected fat or combination of fats is the ability to form a non-crystallizing, amorphous coating during the so-called granulation process. The particles comprising the preserved materials can be pre-milled to a required size distribution specific to the material to be preserved and/or the requirements of the downstream process. A milling device such as a Comil® or similar equipment can effect this milling. Alternatively, the material can be taken "as is" directly from the coarse milling operation described previously. In either case the particles are introduced into a granulator such as those manufactured by Robot Coupe, although any similar high shear granulation machine will suffice. The methods described herein are not limited to practice in a granulation machine, but encompass any known methods and equipment by which the particulate preparations can be coated, including for example, food processor, fluidized beds, and other conventional mixing methods. Preferably, the temperature is maintained below the melting point of the fat, thereby resulting in a conventional solid fat coat.

The coating material from the group listed above is introduced to the machine interior either prior to energizing the machine or during machine operation. If fat introduction is done prior to machine operation, the fat may be in solid, semi-solid or liquid form. Once started, the granulator or other machine incorporates the foam particles into the fat, in some instances, agglomerating the small foam particles into particles of a larger average particle size, ideally with a fat overcoat on the particle surface. If fat introduction is done during machine operation, the preferred method is to melt the fat if it is not already in the liquid state and then spray the fat at a controlled rate and spray droplet size determined by the needs of the process onto the foam particles as they circulate in the running granulator. The machine then granulates the resulting mass in a similar manner as with the pre-operation fat addition method with the endpoint being a fat overcoat on the surface of the particles.

Depending on the nature of the fat used, more specifically, its physical properties, such as melting point, viscosity and surface tension, the process may require that it be done at a specific temperature to preclude forming the starting material into a single large mass rather than discreet particles. This process temperature range could be from 0–60° C., depending on the fat utilized. More preferably, the temperature is below room temperature, in a range of from 0–20° C. Most preferably, the temperature is below the melting point of the fat. Temperature can be controlled via heating/cooling jackets on the granulator, process environment temperature and other means known to those with skill in the art. In a preferred embodiment, the fat would be semi-liquid or liquid at room temperature and solid at refrigerated temperatures (2–8° C.). This would ensure that the fat is in an amorphous state at normal room storage temperature, thus providing an effective barrier to humidity.

Because the fat coating is specified to be amorphous in character and is preferred to be liquid or near liquid at room temperature the problem arises of how to keep the particles formed during the temperature controlled cold granulation process from coalescing upon room temperature storage. This problem can be effectively overcome by introducing a hard shell coating on top of the fat coating in a second stage of the granulation operation, analogous to the production of M&M's. Alternatively, the fat coated granules can be processed in a temperature controlled fluidized bed or spinning disk coating device. The material used to form the hard shell coating can be a protein, a protein mixture, such as gelatin, a sugar, such as sucrose, a polymer, such as polyethylene glycol, a starch such as hydroxy-ethyl starch, or similar materials. A major requirement is that the hard shell source material be in the form of a fine powder such that the fat coated granules can be rolled or mixed in the powder or fluidized with the powder. As the agitation proceeds the process temperature is increased to approach the melting point of the fat coating. This permits the hard shell coating material to stick to the surface of the fat coated granule. Depending upon the type of hard shell material used, an activating solvent, such as water or acetone applied in a light spray might be required to effectively cross-link the hard shell particles together and form the hard shell coating. In the event that a solvent is needed, the process mixing continues until the solvent is completely evaporated and the hard shell particles have formed a continuous hard coating over the fat coated granule. If solvent is not necessary, the process temperature is simply lowered allowing the hard shell particles to solidify and form a hard shell coating.

In either case once cooled to room temperature, the hard shell coated, fat coated granules can be bulk packaged for further downstream end-use packaging. Since the material is now effectively protected from the ingress of moisture via atmospheric humidity, there is no need to take special packaging precautions such as those described above. In addition, the combination of foam preservation and hard shell coating effectively affords protection from temperature extremes as well. Examples of typical end-use could be as a probiotic coating on cereal or filled in a gelatin capsule as a nutritional supplement. Either environment would quickly destroy the activity of an unprotected probiotic.

What is claimed is:

1. A method for providing long-term ambient temperature preservation of a sensitive biological sample, having a biological activity, comprising the steps of:

preserving the sensitive biological sample by drying under conditions wherein at least a portion of the biological activity is retained;

milling the dried sample to form a particulate preparation;

coating the particulate preparation with a first layer comprising a hydrophobic substance; and applying a second layer over the first layer, the second layer forming a hard shell at ambient temperature.

2. The method of claim 1, wherein the sensitive biological sample is selected from the group consisting of a bacteria, a pharmaceutical composition, a vaccine, and a nutritional supplement.

3. The method of claim 1, wherein the hydrophobic substance comprises a fat or an oil.

4. The method of claim 3, wherein the fat or oil is selected from the group consisting of cottonseed, corn, palm, soy, grapeseed (canola), cod-liver and other fish-based oils, omega-3 fatty acids, neem, olive, peanut, poppy, safflower, sesame and wheat-germ.

5. The method of claim 1, wherein coating the particulate preparation is accomplished using a device adapted to produce a high shear mixing action.

6. The method of claim 1, wherein the second layer comprises a material selected from the group consisting of a sugar, a protein, a polymer, or a mixture thereof.

7. The method of claim 1, wherein preserving the sensitive biological sample comprises drying the sample in the presence of a protectant formulation.

8. The method of claim 7, wherein the sensitive biological sample and protectant formulation are boiled under vacuum to form a mechanically stable foam.

9. The method of claim 1, wherein preserving the sensitive biological sample comprises drying the sample under a vacuum at a temperature greater than 20° C. for a period of time sufficient to increase the glass transition temperature of the sample above 20° C.

10. A storage particle adapted for long-term ambient temperature preservation of a sensitive biological material, comprising a dehydrated preparation of the sensitive biological material, a first layer comprising a hydrophobic substance which surrounds the dehydrated preparation of the biological material, and a second layer comprising a hard shell at ambient temperature which surrounds the first layer, wherein said first layer minimizes exposure of the dehydrated preparation of the biological material to atmospheric moisture.

11. The storage particle of claim 10, wherein the hydrophobic substance comprises a fat or an oil.

12. The storage particle of claim 11, wherein the fat or oil is selected from the group consisting of cottonseed, corn, palm, soy, grapeseed (canola), cod-liver and other fish-based oils, omega-3 fatty acids, neem, olive, peanut, poppy, safflower, sesame and wheat-germ.

13. The storage particle of claim 10, wherein the second layer comprises a material selected from the group consisting of a sugar, a protein, a polymer, or a mixture thereof.

14. The storage particle of claim 10, wherein the dehydrated preparation of the sensitive biological material further comprises a protectant formulation.

* * * * *